R. J. CLAY.

Seed-Planter.

No. 20,193.

Patented May 11, 1858.

UNITED STATES PATENT OFFICE.

R. J. CLAY, OF ST. LOUIS, MISSOURI.

IMPROVEMENT IN CORN-PLANTERS.

Specification forming part of Letters Patent No. 20,193, dated May 11, 1858.

*To all whom it may concern:*

Be it known that I, R. J. CLAY, of the city and county of St. Louis, and State of Missouri, have invented a new and Improved Corn-Planter; and I do hereby declare that the following is a full, clear, and exact description of the same, reference being had to the annexed drawings, making part of this specification, in which—

Figure 1:
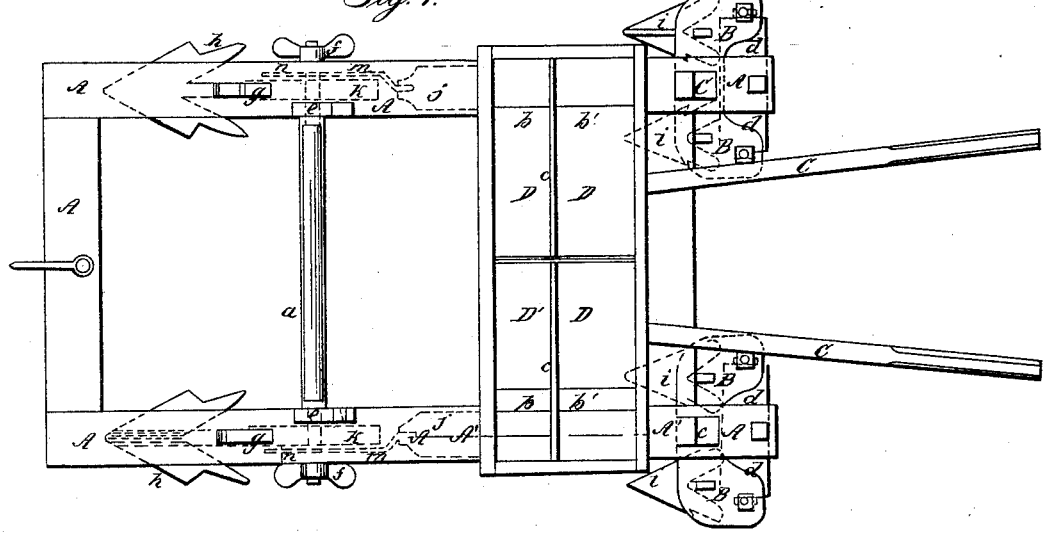
Figure 2:
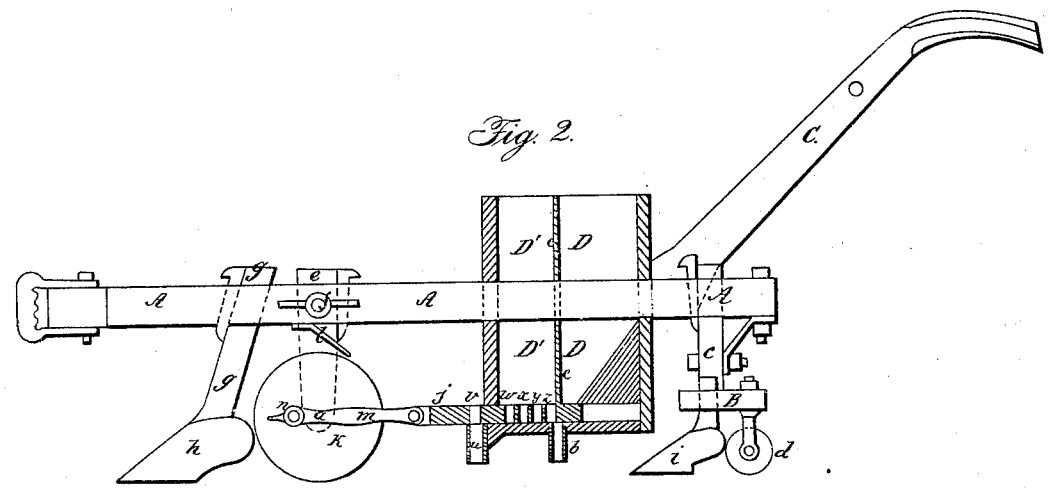

Figure 1 is a plan; Fig. 2, a side elevation, showing a section through A' A'.

My invention consists of a double seed-hopper, and in applying thereto a reciprocating drop-valve so constructed and operated as to cause it to drop one, two, or more hills of corn every revolution of the wheel, to which the said valve is to be connected and by which it is to be operated, the said hopper and drop-valve to be constructed, arranged, and operated as hereinafter set forth.

To enable others to make and use my invention, I will proceed to describe its construction and operation.

Similar letters of reference represent corresponding parts in the different figures.

A A, &c., is the frame of the machine.

D' D is the seed-hopper, which is fixed to the frame, as shown, and which is divided by means of a partition, (shown at o.) This hopper has a hole in the bottom of it (shown at t) and a tube fixed on the front of it, (shown at u,) and in the bottom of the said hopper the drop-valve j is introduced, which is worked to and fro by means of the wheel k, to which it is connected at n by means of the connecting-rod m. The wheel k is fixed on the shaft a, which is fixed in the upright piece c.

l is a scraper to prevent the wheel from clogging with mud.

h is the furrowing-plow, which is secured to the frame by means of the upright g, which is wedged in the frame, as shown. The wheel k follows directly into the path of the plow h, and by it the depth of the furrow is regulated, for by means of the thumb-screw f the wheel may be raised or lowered, as the case may require.

i i i i are cultivating-plows, which are fixed to the back end of the main frame by means of a separate frame, (shown at B,) which is secured to the main frame by means of the upright piece c. These cultivating-plows are fixed in the frame B—one on each side of furrow made by the plow h—so as to cover the seed and close the furrow made by the said plow.

To the frame B, and behind the cultivating-plows, the roller d is fixed, which is designed to gage the depth of the cultivators and pack the earth on the seed.

C is the handle or tail of the machine, by which its position is governed.

b b are the openings which lead from the upper to the lower hopper.

It will be seen by reference to the drawings that the valve j has a number of holes in it, and that the hole v is directly over the tube u when the machine is in the position shown on the drawings.

Now, suppose the machine in operation, and suppose it is desired to drop one hill of corn each revolution of the wheel k. Then the hopper D' only must be supplied with grain, and the valve j must be removed and its place supplied with one similar in every respect, excepting the holes w x y z, the valve being made plain where these holes are shown. Then the valve in traveling back will receive a supply of grain in the hole v, and in traveling forward will deposit it into the tube u, thus dropping a hill every revolution of the wheel. Now, suppose it is desired to drop eight hills every revolution of the wheel. Then the two hoppers D' D must be supplied with grain, and the valve j must have all the holes in it shown, excepting the hole v, which must be omitted, in which case the valve in traveling back will drop a hill when the hole z comes opposite the tube t, and so when the hole y comes opposite the said tube, and so on until the hole w has passed the tube t and the partition o as far to the right as the hole z is to the left, when four hills will be dropped, and when the wheel k will have performed but half of a revolution, thus causing the valve to drop four more hills while traveling forward to complete its revolution, which makes eight in a single revolution of the wheel. The number of hills dropped each revolution may of course be varied by putting more or less holes in the valve, as may be required.

Having thus described the construction and operation of my invention, what I claim as new, and desire to secure by Letters Patent, is—

The arrangement of the hoppers D D', valve $j$, wheel $k$, shaft $a$, standard $e$, and scraper $l$, when the whole are constructed to operate conjointly, as and for the purpose specified.

R. J. CLAY.

Witnesses:
THOS. WALSH,
AMOS BROADNAX.